United States Patent [19]
Merlin et al.

[11] Patent Number: 5,589,681
[45] Date of Patent: Dec. 31, 1996

[54] CARD RECEIVER ENABLING A BROKEN CARD TO BE EJECTED AND CARD READER USING IT

[75] Inventors: Bruno Merlin, Argenteuil; Jean Quintana, Cergy, both of France

[73] Assignee: Societe d'Applications Generales d'Electricite et de Mecanique Sagem, France

[21] Appl. No.: 351,238

[22] PCT Filed: Jun. 4, 1993

[86] PCT No.: PCT/FR93/00533

§ 371 Date: Jan. 26, 1995

§ 102(e) Date: Jan. 26, 1995

[87] PCT Pub. No.: WO93/25977

PCT Pub. Date: Dec. 23, 1993

[30] Foreign Application Priority Data

Jun. 4, 1992 [FR] France .................. 92 06781

[51] Int. Cl.$^6$ .................................................. G06K 13/00
[52] U.S. Cl. .......................................... 235/482; 235/483
[58] Field of Search .................................. 235/482, 483, 235/485, 475, 479, 441; 439/260

[56] References Cited

U.S. PATENT DOCUMENTS

| | | | |
|---|---|---|---|
| 4,575,703 | 3/1986 | Shishido | 235/479 |
| 4,932,889 | 6/1990 | Bleier | 439/260 |
| 4,976,630 | 12/1990 | Schuder | 439/260 |
| 5,369,259 | 11/1994 | Bleier | 235/441 |

FOREIGN PATENT DOCUMENTS

| | | |
|---|---|---|
| 0348929 | 6/1989 | European Pat. Off. . |
| 0351103 | 6/1989 | European Pat. Off. . |
| 3602668 | 7/1987 | Germany . |

*Primary Examiner*—Donald T. Hajec
*Assistant Examiner*—Karl Frech
*Attorney, Agent, or Firm*—Graham & James LLP

[57] ABSTRACT

A card reader that is resistant to vandalism is disclosed. The card receiver (1), includes a slot (4) for receiving the front part of a card (3), and card reader (1L) using it. The card receiver (1) includes a bending element (6, 17P) applying, to the card (3), a torsional moment with respect to a bearing lip (5) of the slot (4) or to an opposed second bearing element (10), so that the card (3), once broken, can be pushed in by another card so as to lose contact with the bearing lip (5) and to drop into a cavity (12).

11 Claims, 4 Drawing Sheets

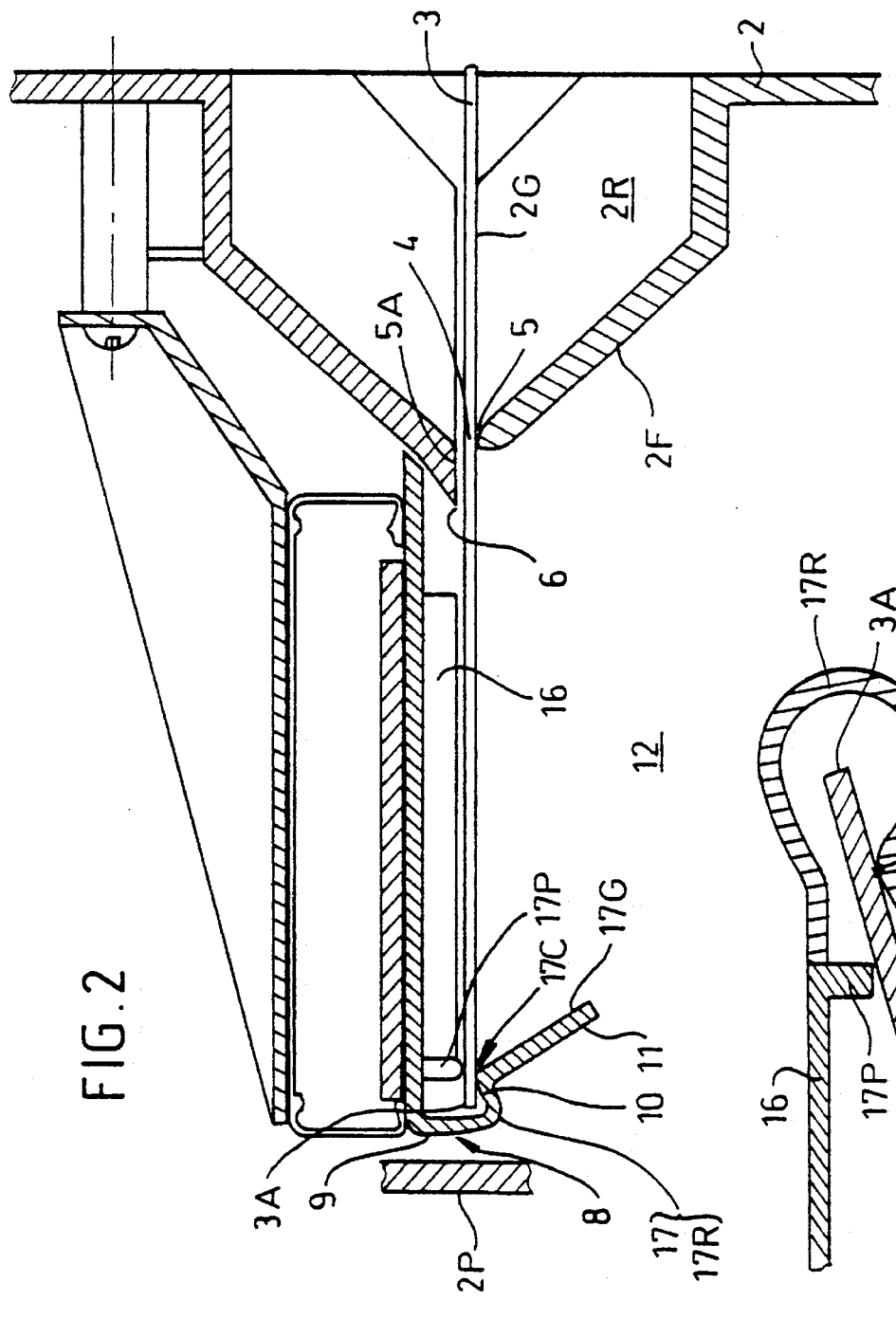

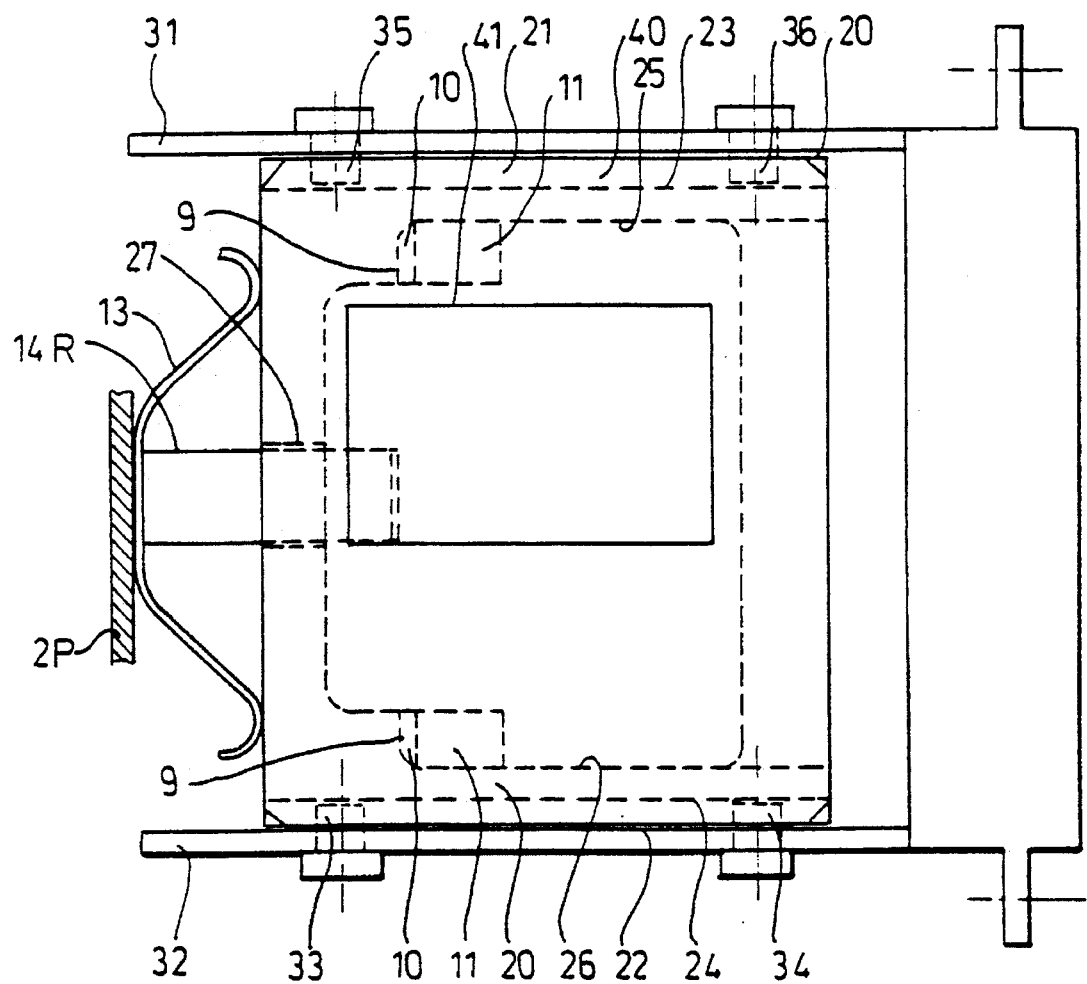

CARD RECEIVER ENABLING A BROKEN CARD TO BE EJECTED AND CARD READER USING IT

BACKGROUND OF THE INVENTION

1. Field of the Invention

The present invention relates to an information-bearing-card receiver, including an insertion slot made between two lips, with a bearing lip, means for bending the card which are arranged, in the direction of insertion of the card, beyond this bearing lip, means for guiding the front edge of the said card in order to bring the card into the read position and means for receiving, in the read position, the front edge of the card, which include a limit-stop wall constructed so as to be moved in the direction of insertion of the card under the action of a thrust by the card and against the action of first return means, and also relates to a card reader using such a receiver.

2. Discussion of Related Art

Such card receivers, which may be associated with a device for reading the information carried by the said card, are already known.

Thus, card-payment public telephone sets include a slot, where a chip card is inserted, which remains partially accessible to the user. This slot is fitted at the back of a cavity located at the front face of the set, and a flap has to be brought down in front of this cavity in order to authorise the telephonic communication.

The purpose of such an arrangement is to avoid, in so far as possible, the card breaking flush with the slot, which prevents it from being extracted and takes the telephone set out of service.

However, this is not totally effective and, in particular, offers no protection from willful acts of vandalism.

Moreover, the reading of the card is provided by a read device, a read interface of which includes a sensor, such as an optical, magnetic or electrical sensor with engagment of contacts on the card.

Now, this card may no occupy precisely the desired position if its user presses on it strongly, which will create a read error. This is remedied by imposing the said closure to the flap, however this is an annoying constraint which requires, in addition, an alarm such as an audible alarm in order to prevent the card from being forgotten.

DE-A-3 602 668 teaches a card-receiver of the above-mentioned type, in which the card drags a sliding carriage which can be shifted up to a locked read-position and, by a further forward movement of the card which unlocks it, the carriage is brought back to a rest position near the bearing lip, under the action of a return spring.

The carriage executes the guidance together with the bending of the card towards the direction opposite to the bearing lip, for applying the card on a connector arranged above its read position.

The card is, however, caught with friction by the carriage and it cannot be extracted of it when it is broken flush with the slot.

EP-A-348 929 and EP-A-351 103 include the same teaching as DE-A-3 602 668 et, specifically, also teach grasping the card, which hinders the ejection of a broken card.

SUMMARY OF THE INVENTION

The present invention aims to solve these problems.

For this purpose, the information-bearing-card receiver characterised by the fact that the bending means are arranged for acting in the direction of the bearing lip and against the action of the guiding means and for ejecting the card out of it's introduction path when it is out of reach of the bearing lip.

Thus, a card may end up occupying its read position while still preserving the possibility of receiving an additional thrust causing it to relinquish contact with the said bearing lip.

By virtue of the invention, if the holder of the card breaks it flush with the slot, if suffices to push its broken edge in the direction of insertion, by any suitable means such as, for example, another card, in order that, as soon as the broken card has escaped from the bearing lip, the bending means exert their action on the broken card and eject it out of the insertion path, for example into a retention receptacle.

The limit-stop wall may include a springy articulation having the role of the said return means. This springy articulation may thus be produced very simply in the form of a leaf spring forming an integral part of this limit-stop wall.

Alternatively, the said reception member may be mounted on the return means. These may thus have any desired shape and may optionnaly carry other elements, which thus follow the movement of the reception member.

The bending means may include a component, one end of which is arranged and oriented so as to bear on one face of the card as it is being inserted. II is thus possible to perform the bending very easily since it may be carried out by means of a static component.

The bending means may also include a curved-over leaf spring receiving, in a pinching manner, the front edge of the card. At the end of travel, the latter is thus forcibly inserted into this curved-over leaf spring and is pinched between two contacts, which are substantially parallel to the bearing lip but not facing each other, so as to rotate the broken card when the latter leaves the bearing lip, which ejects it from its read position.

Advantageously, the said leaf spring of the bending means constitutes the said limit-stop wall. Thus, the same component both provides the limit stop and ejects the broken card.

The guide means may be produced by using the said leaf spring of the bending means. The number of components is thus limited.

Second return means, tending to push the card back out of the said reception member, may be provided. They make it easier for a broken card to leave this reception member and thus prevent it from possibly being blocked.

The inner wall of the said card receiver, located close to the bearing lip, may be, at least partially, turned towards the direction of ejection of the broken cards. This arrangement is particularly advantageous when the said second return means are present, which then push a broken card onto this inner wall, the orientation of which makes it easier to guide the broken card out of the position for reading it.

The reception member may be accurately positioned by means of a limit-stop component on which this reception member ends up bearing when it returns towards the position for reading the card, after having been pushed back. It thus prevents this reception member form vibrating, the return means possibly exerting a force applying the reception member against this limit-stop component.

A card reader according to the invention, which includes a card receiver and an interface for reading the said card, is characterised in that the card receiver is such as described hereinabove in relation to the invention and in that the card-reading interface is rigidly attached to the reception member.

The relative position between the card-reading interface and the card itself is thus fixed when the card is pushed in with respect to the position for reading it, with prevents read errors even when bearing on the accessible portion of the inserted card.

BRIEF DESCRIPTION OF THE DRAWINGS

The invention will be better understood with the aid of the following description of preferred embodiments of the card receiver according to the invention, with reference to the attached drawing, in which:

FIG. 2 is a sectional side view showing a second illustrative embodiment of this receiver and of the reader, FIG. 3 is a sectionnal partial side view of the said receiver, showing the ejection of a broken card in the receiver represented in FIG. 2, FIG. 5 is a side view of this carriage and FIG. 6 is a plan view of this carriage.

DETAILED DESCRIPTION OF THE PREFERRED EMBODIMENTS

Figure 1:
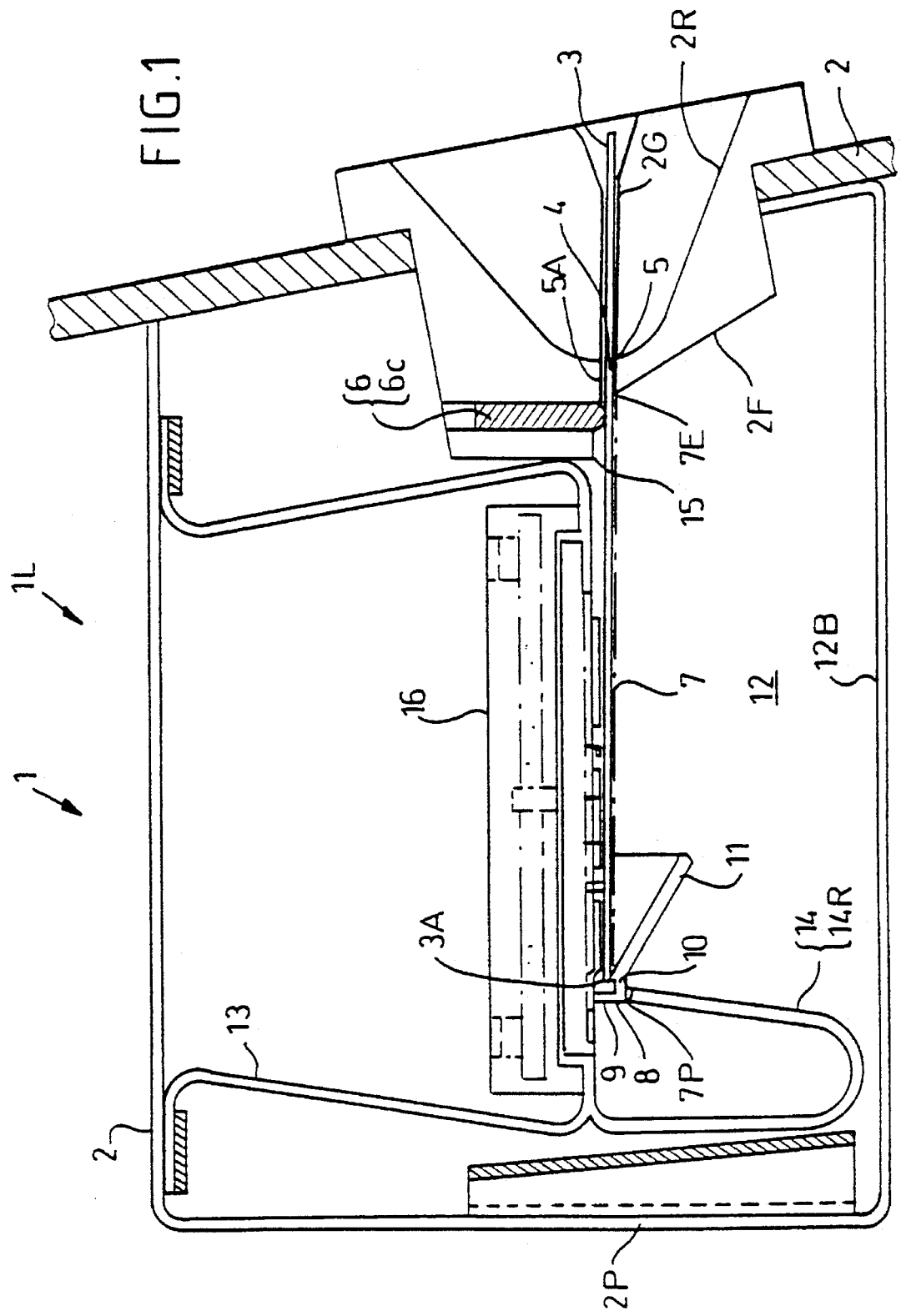
FIG. 1 is a sectional side view showing a first illustrative embodiment of a card receiver and of a card reader using it.

The first embodiment of a card receiver 1 according to the invention, and of a card reader 1L according to the invention using it, is represented in FIG. 1. The card receiver 1 consists of a case 2 which can receive a part of a card 3 of defined thickness and which includes various members intented to receive this card 3. This case 2 includes:

a slot 4, delimited by two lips, respectively 5 and 5A, one of which serves as a bearing lip for a card 3 passing through this slot 4, which, in this example, is fitted at the bottom of a receptacle 2R which includes two lateral slideways 2G having the additionnal role of guiding the card 3;

bending means 6, arranged in the direction of insertion of the card 3 and beyond the bearing lip 5, exerting, on the card 3, a force substantially perpendicular to the faces of the card 3, pressing it against the said bearing lip 5, these bending means 6 consisting of a bending component 6C, made of plastic in this example, placed in such a way that its accessible end lies substantially on the path of insertion of the card 3, the said end having a sloping shape, such as a bevelled or rounded shape, with respect to the said direction of insertion of the card 3, enabling the front edge 3A of this card 3, as it is being inserted, to pass, end-on, from the end of this bending component 6C and to receive therefrom a bearing force on this card 3 tending to bend the card 3 towards the bearing lip 5;

a housing 7, a front end 7E of which is located opposite the said slot 4, having a flattened shape enabling it to receive this card 3 when it has been inserted, by its front edge 3A, by sliding through the slot 4, and having a first position for which the card 3 may undergo a treatment, that is to say be read by the associated card reader 1L;

a reception member 8;

a limit-stop wall 9, forming part of this reception member 8, delimiting a rear end 7P of the housing 7 opposite the said front end 7E, against which the front edge 3A of the card 3 ends up butting;

a second bearing element 10 for the said card 3, also forming part of this reception member 8, partially delimiting the said housing 7 and turned, like the bearing lip 5, extending substantially parallel to the said bearing lip 5, at some distance from the latter in the direction of insertion of the card 3 and fitted in the vicinity of the said rear end 7P of the housing 7;

guide means 11 intended to guide the card 3 towards the second bearing element 10, as the card is being inserted, and fitted in the vicinity of this second bearing element 10, these guide means 11 including a plane which is inclined with respect to the direction of insertion of the card 3, at an angle and of lengths such that it brings the front edge 3A of the card 3 back towards the second bearing element 10 when the card 3 is pushed into the slot 4 which provides only rough guiding on account of the limited size of its edges, in particular if the lateral slideways 2G are absent, and on account of the bending means 6 which tend to deflect the card 3 out of the housing 7;

a cavity 12, capable of receiving a broken card 3 and to prevent it from returning towards the housing 7, this cavity 12 being fitted, with respect to the housing 7, on the side opposite that towards which the bearing lip 5 and the second bearing element 10 are turned, that is to say beneath the housing 7 in this example and first return means 13, rigidly attached to the case 2 and to the said limit-stop wall 9, enabling the latter to move back due to the effect of the card 3 being pushed in further with respect to the first position, the said housing 7 then occupying a second position, the travel of the said first return means 13 being greater than the said width of the bearing lip 5 in the direction of insertion of the card 3, these first return means 13 consisting, in this example, of a leaf spring.

The inner wall 2F of the case 2, located in the region of the bearing lip 5, on the side containing the cavity 12, is turned towards the face 12B of this cavity 12 opposite the housing 7.

As in this example, it is possible to provide second return means 14, such as a leaf spring 14R bent over into a hairpin, one end of which is rigidly attached to the limit-stop wall 9 and the corresponding branch of which ends up butting against the rear wall 2P of the case 2 when this limit-stop wall 9 passes into its second position, whereas the end of the second branch is located in the region of the limit-stop wall 9 and can move with respect to the latter in the direction of insertion of the card 3, and fulfils the same function as the latter, but facing the card 3.

Moreover, the said limit-stop wall 9 ends up butting against a limit-stop component 15, rigidly attached to the case 2, when it reaches its first position from its second position.

A card reader 1L using this card receiver 1 is also represented in this FIG. 1. It includes a read interface 16, such as an optical reader or electrical contactor, fitted facing the housing 7, on its face opposite the cavity 12, that is to say the upper face. This read interface 16 is rigidly attached to the limit-stop wall 9.

In the second embodiment represented in FIGS. 2 and 3, the same elements appear as those mentioned in conjunction whith FIG. 1, with the same references and the same function, except that the function of the bending component 6C is integrated into the lip 5A and that a springy pinching means 17 is fitted consisting of a bent-over leaf spring 17R which is located in the region of the limit-stop wall 9 and which is rigidly attached to the latter. In this example, the limit-stop wall 9 has even been replaced by this springy pinching means 17, the bent-over shape of which defines a hollow shape which includes an opening turned towards the slot 4 and which can receive, between two lips substantially parallel to the bearing lip 5, the front edge 3A of the card 3, which then enlarges this opening a little by pushing back slightly the point of contact 17C of the leaf spring 17R with the card 3, this point of contact being located on the side containing the cavity 12. The card 3 is pressed against the face opposite the cavity 12 on a protuberance 17P rigidly attached to the springy pinching means 17, the point of contact 17C of this springy pinching means 17 with the card 3 being closer to the limit-stop wall 9 than is the point fo contact of the said protuberance 17P with the card 3. This leads to a bending effect of the card 3, due to this protuberance 17P, with respect to the point of contact 17C. The leaf spring 17R of this springy pinching means 17 may be extended, as in this example, into a shape having an inclined plane 17G serving as a means 11 for guiding the card 3, as were explained previously.

For clarity, the second return means 14 have not been represented in the figure, but they could also be fitted.

The card reader 1L is fitted substantially in the same manner as in FIG. 1. In this particular example, the said protuberance 17P rigidly attached to the springy pinching means 17 is constituted by the sidewall of the read interface 16 of this card reader 1L which is close to the limit-stop wall 9.

Figure 4:
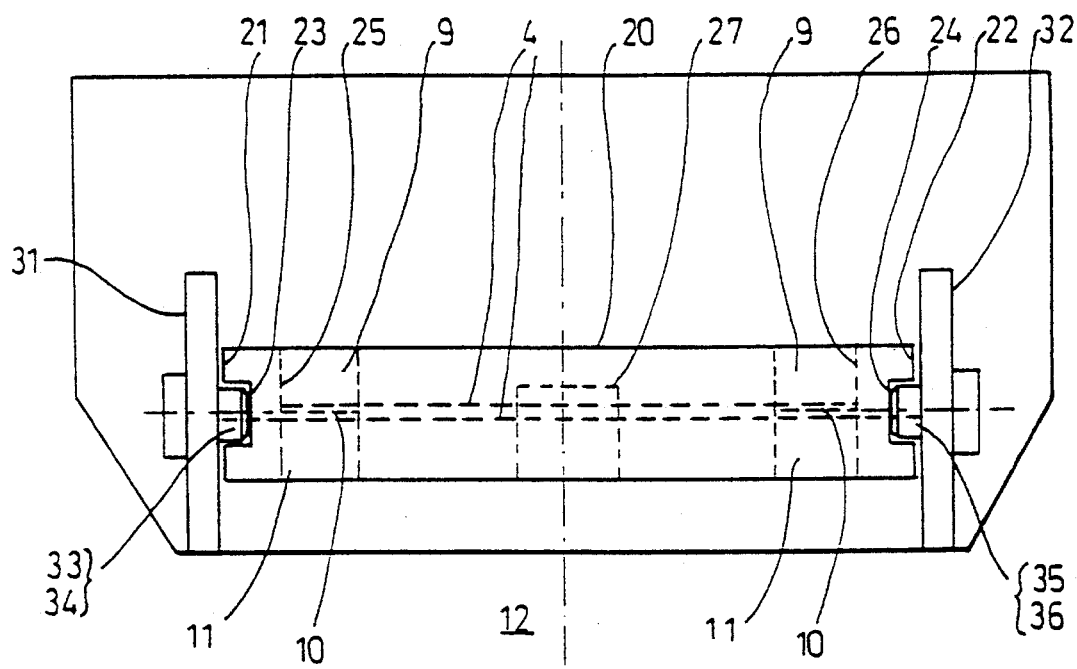
FIG. 4 is a rear view of a third embodiment which includes a moveable carriage which can receive a card and carry a card reader.
Figure 5:
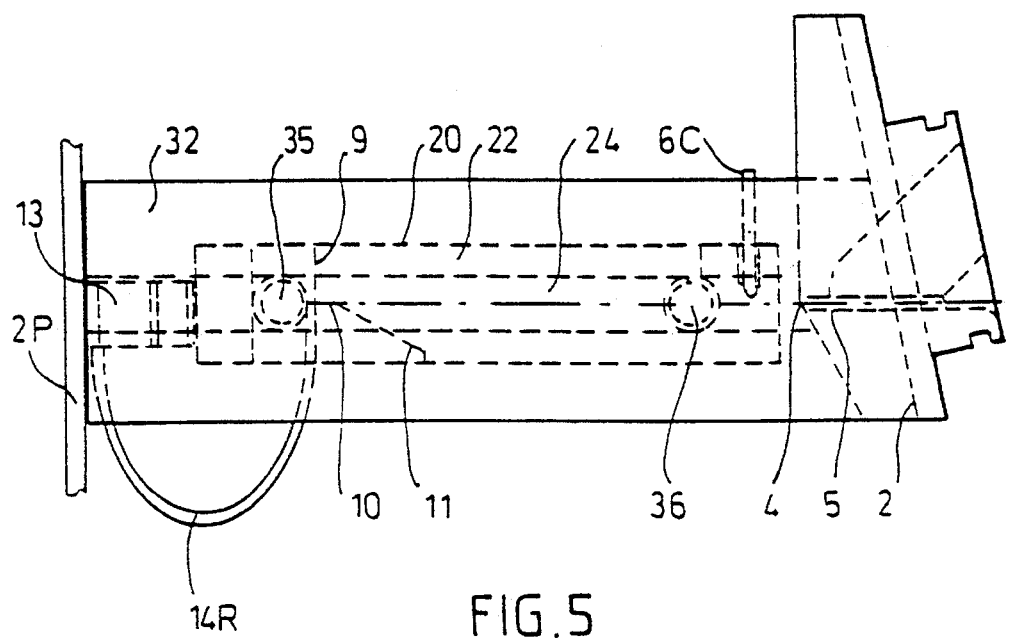

FIGS. 4 and 5 show, seen respectively from the rear part of the card receiver 1 and from the side, a third embodiment of the card receiver 1 according to the invention, which includes a moveable carriage 20, carrying a card-reading element, which is carried and guided by a U-shaped frame and moves under the effect of a card being pushed in against the action of a leaf spring 13, while bending means 6C carried by this carriage 20 press the card 3 towards the face 12B of the cavity 12. This carriage 20 includes two opposed outer sidewalls 21 and 22, extending parallel to the direction of insertion of a card 3 in planes perpendicular to the large faces of a card 3, each including respectively a straight groove 23 and 24 oriented in the said direction of insertion of a card 3. The inclined plane 11, which serves for guiding a card 3, is produced in the form of a pair of inclined planes of restricted size which are located close to the said sidewalls 21 and 22 of the carriage 20, each being continued by the second, duplicated, bearing element 10 and by the limit-stop wall 9 which is likewise duplicated. The lateral edges of the card 3 are guided by two inner sidewalls 25 and 26 of the carriage 20, which are parallel to the sidewalls 21 and 22. This carriage 20 includes a groove 27 in the centre of its lower face turned towards the cavity 12, the groove 27 being turned towards this cavity 12 and intended to receive the end of the leaf spring 14R which is provided for being in contact with the card 3, as shown in FIG. 6.

Two arms 31 and 32, respectively arranged parallel to and against the outer sidewalls 21 and 22, each include a pair of spaced-apart slide rollers 33, 34 and 35, 36 respectively housed in one of the said grooves 23 and 24, thus supporting the carriage 20 and guiding it in the direction of insertion of a card 3. These arms 31 and 32 are connected to the inner wall of the front face of the case 2, on either side of the slot 4, close to each of its ends.

FIG. 6 is a plan view of this carriage 20 and of the associated elements described hereinabove, as well as of a card receptable plate 40 ending up covering exactly and forming the upper part of the housing 7. A window 41 of this plate 40 allows access to the card 3 for the means for reading the latter. The spring 14R penetrates into the groove 27 of the carriage 20 in order to come into contact with the front edge 3A of the card 3, while another part of this spring, bearing on the inner face of the rear wall 2P of the case 2, acts as the spring 13 intended to push back the carriage 20.

The operation of the card receiver 1 and of the associated card reader 1, accordint of the first embodiment, is as follows. The card 3 is inserted into the slot 4 and pushed in so as to end up touching the limit-stop wall 9, by being guided towards the latter by the guide means 11. During its travel, until the contact of its front edge 3A with the limit-stop wall 9, the card 3 comes into contact with the bending component 6c which then applies a force, directed towards the cavity 12, to it and bends it.

As regards the limit-stop wall 9, it may move back towards its second position, and it comes back to its first position due to the effect of the first return means 13 when the card 3 is released by the user. II should be noted that the limit-stop wall 9 itself may include a springy articulation having the role of the said first return means 13, that is to say that a leaf spring, one end of which is rigidly attached to the case 2, may serve as a reception member 8 as well as first return means 13. Since the read interface 16 is rigidly attached to the limit-stop wall 9, it follows the movement of the latter and may continue correctly providing its reading even during this movement.

If the card 3 is broken flush with the slot 4, which makes it impossible to withdraw it, a user may use another card acting as a tool passing into the slot 4 and pushing the broken portion of the card 3. The latter is thus pushed back out of the contact with the bearing lip 5, since the limit-stop wall 9 may be pushed in more than the width of this bearing lip 5. When the tool card is withdrawn, the broken card 3 tends to return towards the slot 4, due to the effect of the first return means 13 bringing the limit-stop wall 9 back towards the first position.

However, the freeing of the broken card 3 from its bearing lip 5 enables the bending means 6, including the said bending component 6C, to cause this brodken card 3 to rotate about the second bearing element 10, which prevents the broken card 3 from returning onto this bearing lip 5. No longer being held by the two ends of the housing 7, it continues to pivot about the second bearing element 10 and falls under gravity into the cavity 12. When the second return means 14 are fitted, they contribute to pushing back the broken card 3 with respect to the limit-stop wall 9, which makes it easier to eject it from the housing 7. In addition, if the said inner wall 2F of the case 2 is inclined as indicated, the second return means 14 push the broken portion of the card 3 back against this inner wall 2F, which, by reaction, tends to cause the card 3 to pivot, which extends the action of the bending means 6. For its part, the limit-stop component 15 serves to provide a defined position for the limit-stop wall 9 and to damp movements due to vibrations.

The operation of the card receiver 1 and of the associated card reader 1L, which are described in conjunction with FIG. 2, follows an identical principe to that explained hereinabove, some of the means having a different constitution. Thus, the bending means 6 do not include the bending component 6C but are constituted by the protuberance 17P against which the card ends up being applied when it comes into contact with the limit-stop wall 9 following the guide means 11, and the springy pinching means 17 constituted by the bent-over leaf spring 17R, it being also possible for guiding to be provided by this leaf spring 17R.

A broken card 3 is, after passing into the second position, ejected from the housing 7 by the action of the leaf spring 17R associated with the protuberance 17P, as shown in FIG. 3.

In the embodiments explained hereinabove, the bending component 6C may have a brushing role preventing the intrusion of dust towards the card reader. In addition, a sensor, for example a mechanical or optical sensor, may also be fitted upstream of the bending component 6C, in order to control this bending component. The latter, consequently modified, occupies, at rest, a closed position preventing the passage of any article. When a card 3 is inserted into the housing 7, it is recognised as such by the sensor, which then unlocks the bending component 6C, this enabling the forward motion of the card 3 to be continued.

What is claim is:

1. Information-bearing-card receiver (1), including an insertion slot (4) made between two lips (5, 5A), with a bearing lip (5) being one of the two lips, means (6, 17P) for bending the card (3) which are arranged, in the direction of insertion of the card (3), beyond this bearing lip (5), means (11) for guiding the front edge (3A) of the said card (3) in order to bring the card (3) into a read position in which the card is capable of being, read when the card is fully inserted, and means (8) for receiving, in the read position, the front edge (3A) of the card (3), which include a limit-stop wall (9) constructed so as to be moved in the direction of insertion of the card (3) under the action of a thrust by the card (3) and against the action of first return means (13), characterized by the fact that the bending means (6, 17P) are arranged for acting in the direction of the bearing lip (5) and against the action of the guiding means (11) and for laterally ejecting the card (3) out of its introduction path when is out of reach of the bearing lip (5).

2. Card receiver according to claim 1, in which the limit-stop wall (9) includes a springy articulation having the role of the said first return means (13).

3. Card receiver according to claim 1, in which the said receiving means (8) is mounted on the first return means (13).

4. Card receiver according to of claim 1, in which the bending means (6, 17P) include a component (6), one end of which is arranged and oriented so as to bear on one face of the card (3) as this card (3) is being inserted into the said card receiver (1).

5. Card receiver according to claim 1, in which the bending means (6, 17P) are associated with a curved-over leaf spring (17R) receiving, in a pinching manner, the front edge (3A) of the card (3).

6. Card receiver according to claim 5, in which the said leaf spring (17R) associated with the bending means constitutes the said limit-stop wall (9).

7. Card receiver according to claim 5, in which the said leaf spring (17R) associated with the bending means acts as the guide means (11).

8. Card receiver according to claim 1, in which second return means (14) tend to push the card (3) back out of the said receiving means (8).

9. Card receiver according to claim 1, in which the inner wall (2F) of the said card receiver (1) located close to the bearing lip (5) is, at least partially, turned towards the direction of ejection of the broken cards (3).

10. Card receiver according to claim 1, in which a limit-stop component (15), on which this receiving means (8) ends up bearing when it returns towards the position for reading the card (3), after having been pushed back, is provided in order to position the receiving means (8) accurately.

11. Card receiver according to one of claims 1 to 10 in which said receiving means(8) is rigidly attached to a card reading interface (16) of a card reader (1L) for reading said card (3).

* * * * *